US006937734B2

(12) United States Patent
Abe

(10) Patent No.: US 6,937,734 B2
(45) Date of Patent: Aug. 30, 2005

(54) MUTE APPARATUS AND MUTE METHOD

(75) Inventor: Ryoji Abe, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 866 days.

(21) Appl. No.: 09/867,875

(22) Filed: May 30, 2001

(65) Prior Publication Data

US 2002/0031235 A1 Mar. 14, 2002

(30) Foreign Application Priority Data

May 30, 2000 (JP) ....................................... 2000-160840

(51) Int. Cl.[7] ................................................ H02B 1/00
(52) U.S. Cl. ....................................... 381/123; 381/94.5
(58) Field of Search ................................ 381/123, 104, 381/94.5

(56) References Cited

U.S. PATENT DOCUMENTS 5,838,803 A * 11/1998 Keum et al. ............... 381/94.5

FOREIGN PATENT DOCUMENTS

JP H01-107055 7/1989

* cited by examiner

*Primary Examiner*—Brian Tyrone Pendleton
(74) *Attorney, Agent, or Firm*—Pearne & Gordon LLP

(57) ABSTRACT

A mute apparatus comprises a plurality of mute switches 7 each operative to assume two operation states consisting of a mute-on state and a mute-off state; a mute executing switch 6 operative to assume two executing states consisting of a mute-on state and a mute-off state; mute switch control data generating means 3 for generating mute switch control data elements indicative of the operation states of the respective mute switches 7; mute switch control data determining means 4 for determining whether a mute executing switch 6 is to assume the mute-on or mute-off state on the basis of the mute switch control data elements; and mute switch means 5 for having the mute executing switch 6 selectively assume the mute-on and mute-off states on the basis of the mute-on or mute-off state determined by the mute switch control data determining means 4, thereby making it possible for the single mute switch means 5 to determine the execution state of the mute executing switch 6 to mute or unmute an audio signal inputted by the inputted terminal 1 on the basis of the operation states of a plurality of the mute switches.

10 Claims, 9 Drawing Sheets

P R I O R A R T

MUTE APPARATUS AND MUTE METHOD

BACKGROUND OF THE INVENTION

1. Field of the Invention

The present invention relates to a mute apparatus for muting and unmuting an audio signal and a mute method of operating the mute apparatus, and more particularly to a mute apparatus having a plurality of mute switches.

2. Description of the Related Art

As a mute apparatus of this type, there have so far been proposed a wide variety of mute apparatuses having a plurality of mute switches for muting and unmuting an audio signal. This type of the mute apparatus generally comprises an input terminal, an output terminal, a plurality of mute switch control means, a plurality of mute switch control data generating means, and a plurality of mute switches. The mute apparatus is utilized for muting and unmuting an input audio signal to output a muted or unmuted audio signal.

FIG. 9 shows a conventional mute apparatus 900 having three mute switches. The number of mute switches may be changed depending on the mute apparatus in use. The conventional mute apparatus 900 comprises an input terminal 1, an output terminal 2, first mute switch control means 24, second mute switch control means 25, third mute switch control means 26, first mute switch control data generating means 27, second mute switch control data generating means 28, third mute switch control data generating means 29, a first mute switch 71, a second mute switch 72, and a third mute switch 73.

The input terminal 1 is adapted to input an audio signal and output the audio signal to the first mute switch control means 24. The first mute switch 71 is adapted to selectively assume two operation states consisting of mute-on and mute-off states. The second mute switch 72 is adapted to selectively assume two operation states consisting of mute-on and mute-off states. The third mute switch 73 is adapted to selectively assume two operation states consisting of mute-on and mute-off states. The first mute switch control means 24 is adapted to selectively assume two execution states consisting of mute-on and mute-off states to selectively mute and unmute the audio signal inputted by the input terminal 1 and output a muted or unmuted audio signal to the second mute switch control means 25. The second mute switch control means 25 is adapted to selectively assume two execution states consisting of mute-on and mute off states to selectively mute and unmute the muted or unmuted audio signal outputted by the first mute switch control means 24 and output a muted or unmuted audio signal to the third mute switch control means 26. The third mute switch control means 26 is adapted to selectively assume two execution states consisting of mute-on and mute-off states to selectively mute and unmute the muted or unmuted audio signal outputted by the second mute switch control means 25 and output a muted or unmuted audio signal to the output terminal 2. The output terminal 2 is adapted to output the muted or unmuted audio signal outputted by the third mute switch control means 26.

The first mute switch control data generating means 27 is adapted to generate a first mute switch control data element indicative of the operation state of the first mute switch 71, and the first mute switch control means 24 is adapted to assume the mute-on state or mute-off state on the basis of the first mute switch control data element. The second mute switch control data generating means 28 is adapted to generate a second mute switch control data element indicative of the operation state of the second mute switch 72, and the second mute switch control means 25 is adapted to assume the mute-on state or mute-off state on the basis of the second mute switch control data element. The third mute switch control data generating means 29 is adapted to generate a third mute switch control data element indicative of the operation state of the third mute switch 73, and the third mute switch control means 26 is adapted to assume the mute-on or mute-off state on the basis of the third mute switch control data element.

The operation of the conventional mute apparatus 900 will be described hereinlater.

As shown in FIG. 9, the first input terminal 1 is firstly operated to input an audio signal, and output the audio signal to the first mute switch control means 24. The first mute switch control means 24 is then operated to mute the audio signal inputted by the input terminal 1 and output the muted audio signal to the second mute switch control means 25 when the first mute switch control data generating means 27 is operated to generate a first mute switch control data element indicative of the mute-on state of the first mute switch 71. The first mute switch control means 24 is operated to unmute the audio signal inputted by the input terminal 1 and output the audio signal to the second mute switch control means 25 when the first mute switch control data generating means 27 is operated to generate a first mute switch control data element indicative of the mute-off state of the first mute switch 71.

Similarly, the second mute switch control means 25 is operated to mute the audio signal inputted by the first mute switch control means 24 and output the muted audio signal to the third mute switch control means 26 when the second mute switch control data generating means 28 is operated to generate a second mute switch control data element indicative of the mute-on state of the second mute switch 72. The second mute switch control means 25 is operated to unmute the audio signal inputted by the first mute switch control means 24 and output the audio signal to the third mute switch control means 26 when the second mute switch control data generating means 28 is operated to generate a second mute switch control data element indicative of the mute-off state of the second mute switch 72.

The third mute switch control means 26 is operated to mute the audio signal inputted by the second mute switch control means 25 and output the muted audio signal to the output terminal 2 when the third mute switch control data generating means 29 is operated to generate a third mute switch control data element indicative of the mute-on state of the third mute switch 73. The third mute switch control means 26 is operated to unmute the audio signal inputted by the second mute switch 73 and output the audio signal to the output terminal 2 when the third mute switch control data generating means 29 is operated to generate a third mute switch control data element indicative of the mute-off state of the third mute switch 73.

The conventional mute apparatus 900 thus constructed is operated to selectively control the mute switch control means 24, 25 and 26 on the basis of the mute switch control data elements indicative of the operation states of the respective mute switches 71, 72, and 73 generated by the respective mute switch control data generating means 27, 28, and 29.

The conventional mute apparatus 900, however, encounters such a problem that one unit of mute switch control means is needed to process one mute switch control data element, i.e., to control one mute switch. This means that three units of mute switch control means are needed to control three mute switches. This leads to the fact that the "N" units of mute switch control data generating means must be provided to control the "N" units of mute switches. The mute switch control means is generally constructed by hardware. This leads to the fact that the "N" units of the mute switch control means must be provided by hardware, thereby increasing the size and cost of the mute apparatus.

SUMMARY OF THE INVENTION

It is therefore an object of the present invention to provide a mute apparatus which enables to control a plurality of mute switches by means of single mute control means.

It is another object of the present invention to provide a mute apparatus comprising mute switch display means which enables an operator to visually observe the operation states of the mute switches, thereby making it possible for the operator to easily control a plurality of mute switches.

It is a further object of the present invention to provide a mute method which enables to control a plurality of mute switches by means of a single mute control step.

It is a still further object of the present invention to provide a mute method comprising the step of displaying the operation states of the respective mute switches, which enables an operator to visually observe the operation states of the mute switches, thereby making it possible for the operator to easily control a plurality of mute switches.

In accordance with the first aspect of the present invention, there is provided a mute apparatus comprising: a plurality of mute operation switches each operative to assume two operation states consisting of a mute-on state and a mute-off state; a mute executing switch operative to assume two executing states consisting of a mute-on state and a mute-off state; mute switch control data generating means for generating mute switch control data elements indicative of the operation states of the mute operation switches; control data determining means for determining whether the mute executing switch is to assume the mute-on or mute-off state on the basis of the mute switch control data elements; and mute switch control means for having the mute executing switch selectively assume the mute-on and mute-off states on the basis of the mute-on or mute-off state determined by the control data determining means.

The mute apparatus may further comprise switch state display means for selectively displaying the mute-on and mute-off states of the mute operation switches on the basis of the mute switch control data elements generated by the mute switch control data generating means.

The mute apparatus may further comprises:mute switch control data storing means for storing the mute switch control data elements; and mute switch control data operation means for performing an operation between the mute switch control data elements generated by the mute switch control data generating means and the mute switch control data elements currently stored in the mute switch control data storing means to generate mute switch control data elements. The mute switch control data storing means is operated to store the mute switch control data elements obtained as a result of the operation performed by the mute switch control data operation means, and the control data determining means is operated to determine whether the mute executing switch is to assume the mute-on or mute-off state on the basis of the mute switch control data elements obtained as a result of the operation performed by the mute switch control data operation means.

The mute apparatus may further comprise switch state display means for selectively displaying the mute-on and mute-off states of the mute operation switches on the basis of the mute switch control data elements generated by the mute switch control data generating means.

The mute apparatus may further comprise an operation setting switch operative to assume two operation states consisting of a mute-on state and a mute-off state. The mute switch control data generating means is operated to generate mute switch control data elements indicative of the operation states of the mute operation switches and the operation setting switch. The mute switch control data operation means is constituted by an AND operation unit for performing an AND operation between the mute switch control data elements indicative of the operation states of the mute operation switches generated by the mute switch control data generating means and the mute switch control data elements indicative of the operation states of the mute operation switches stored in the mute switch control data storing means; an OR operation unit for performing an OR operation between the mute switch control data elements indicative of the operation states of the mute operation switches generated by the mute switch control data generating means, and the mute switch control data elements indicative of the operation states of the mute operation switches stored in the mute switch control data storing means; a selecting unit for selecting the operation from among the AND operation performed by the AND operation unit and the OR operation performed by the OR operation unit on the basis of the mute switch control data elements generated by the mute switch control data generating means; and an operation switching unit for selectively switching to the AND operation unit 12 and the OR operation unit on the basis of the operation selected by the selecting unit.

The mute apparatus may further comprise switch state display means for selectively displaying the mute-on and mute-off states of the mute operation switches on the basis of the mute switch control data elements generated by the mute switch control data generating means.

In accordance with a second aspect of the present invention, there is provided a mute method comprising the steps of: (a) having mute operation switches selectively assume two operation states consisting of a mute-on state and a mute-off state; (b) generating mute switch control data elements indicative of the operation states of the mute operation switches; (c) determining whether a mute executing switch is to assume the mute-on or mute-off state on the basis of the mute switch control data elements generated in the step (b); and (d) having the mute executing switch selectively assume the mute-on and mute-off states on the basis of the mute-on or mute-off state determined in the step (c).

The mute method may further comprise the step of: (e) selectively displaying the mute-on and mute-off states of the mute operation switches on the basis of the mute switch control data elements generated in the step (b).

The mute method may further comprise the steps of: (f) storing the mute switch control data elements; and (g) performing an operation between the mute switch control data elements generated in the step (b) and the mute switch control data elements currently stored in the step (f) to generate mute switch control data elements;

The step (f) may have the step of storing the mute switch control data elements obtained as a result of the operation performed in the step (g). The step (c) may have the step of determining whether the mute executing switch is to assume the mute-on or mute-off state on the basis of the mute switch control data elements obtained as a result of the operation performed in the step (g).

The mute method may further comprise the step of: (h) selectively displaying the mute-on and mute-off states of the mute operation switches on the basis of the mute switch control data elements generated in the step (b).

In the aforesaid mute method, the step (a) may have the step of having an operation setting switch selectively assume two operation states consisting of a mute-on state and a mute-off state. The step (b) may have the step of generating mute switch control data elements indicative of the operation states of the mute operation switches and the operation setting switch. The step (g) may include the steps of: (g1) performing an AND operation between the mute switch control data elements indicative of the operation states of the mute operation switches generated in the step (b) and the mute switch control data elements indicative of the operation states of the mute operation switches stored in the step (f); (g2) performing an OR operation between the mute switch control data elements indicative of the operation states of the mute operation switches generated in the step (b), and the mute switch control data elements indicative of the operation states of the mute operation switches stored in the step (f); (g3) selecting the operation step from among the step (g1) and the step (g2) on the basis of the mute switch control data elements generated in the step (b); and (g4) selectively switching to the step (g1) and the step (g2) on the basis of the operation selected in the step (g3).

The mute method may further comprise the step of: (i) selectively displaying the mute-on and mute-off states of the mute operation switches on the basis of the mute switch control data elements generated in the step (b).

BRIEF DESCRIPTION OF THE DRAWINGS

The present invention and many of the advantages thereof will be better understood from the following detailed description when considered in connection with the accompanying drawings, wherein.

DESCRIPTION OF THE PREFERRED EMBODIMENTS

Figure 1:
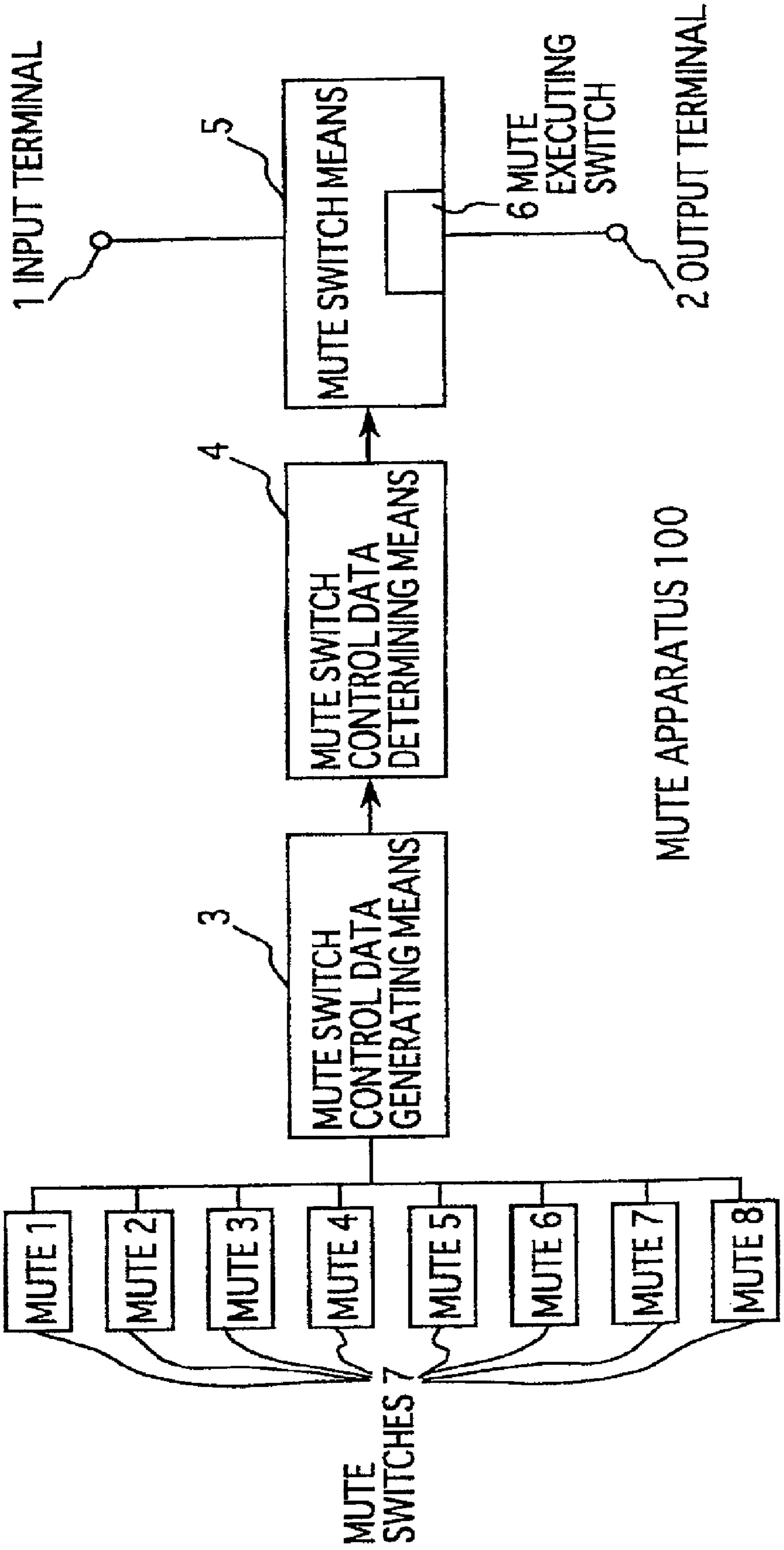
FIG. 1 is a block diagram of a first preferred embodiment of the mute apparatus according to the present invention.

Referring now to FIG. 1 of the drawings, there is shown a first preferred embodiment of the mute apparatus 100 according to the present invention. As shown in FIG. 1, the first embodiment of the mute apparatus 100 according to the present invention comprises an input terminal 1, an output terminal 2, mute switch control data generating means 3, mute switch control data determining means 4, mute switch means 5, a mute executing switch 6, and a plurality of mute switches 7 each operative to assume two operation states consisting of a mute-on state and a mute-off state.

The input terminal 1 is adapted to input an audio signal. The output terminal 2 is adapted to output an audio signal. The mute switch control data generating means 3 is adapted to generate mute switch control data elements indicative of the operation states of the respective mute switches 7. The mute switch 7 constitutes the mute operation switch according to the present invention. The mute switch means 5 includes the mute executing switch 6 operative to assume two executing states consisting of a mute-on state and a mute-off state. The mute switch means 5 constitutes the mute switch control means according to the present invention. The mute switch control data determining means 4 is adapted to determine whether the mute executing switch 6 is to assume the mute-on or mute-off state on the basis of the mute switch control data elements. The mute switch means 5 is adapted to have the mute executing switch 6 selectively assume the mute-on and mute-off states on the basis of the mute-on or mute-off state determined by the mute switch control data determining means 4.

The operation of the first embodiment of the mute apparatus 100 will be described hereinlater with reference to FIG. 1.

According to the present invention, the mute apparatus 100 may have any number of mute switches 7. It is here assumed in the following description that the mute apparatus 100 has eight mute switches 7 placed in series for an audio signal.

Figure 7:
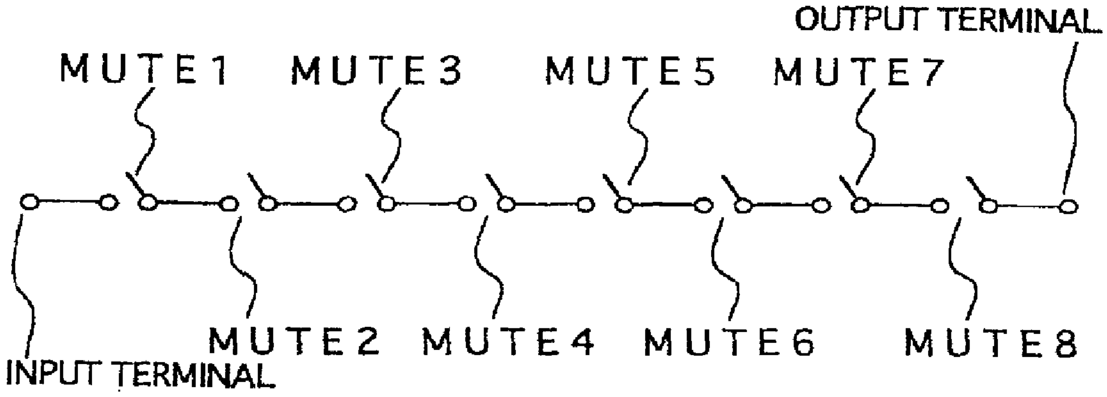
FIG. 7 is a block diagram of mute switches, input and output terminals forming part of the mute apparatus shown in FIG. 1, 2, 3 or 4.

The mute switches 7 are firstly operated to assume two operation states consisting of a mute-on state and a mute-off state. The eight mute switches 7 are placed in series and simply designated by MUTE1, MUTE2, . . . MUTE8, respectively as shown in FIG. 7. The mute-on state is intended to mean to mute an audio signal so that the audio signal is not outputted. The mute-off state is intended to mean to unmute an audio signal so that the audio signal is outputted. The mute switch control data generating means 3 is then operated to define the mute-on state as, for instance, "0" data element and the mute-off state as, for instance, "1" data element, thereby generating mute switch control data elements indicative of the operation states of the eight respective mute switches 7 consisting of a numerical array in the form of binary data of "0" and "1". This means that the mute switch control data elements indicative of the operation states of the eight respective mute switches 7 will be represented in the form of 8-bit data each consisting of binary data of "0" and "1" in order of the mute switches 7, i.e., MUTE1, MUTE2, . . . MUTE8.

All of the eight mute switches 7, for instance, assume the respective mute-on states, thereby causing the mute switch control data generating means 3 to generate 8-bit data of (0, 0, 0, 0, 0, 0, 0, 0) as the mute switch control data elements indicative of the operation states of the respective mute switches 7. All of the eight mute switches 7, for instance, assume the respective mute-off states, thereby causing the mute switch control data generating means 3 to generate 8-bit data of (1, 1, 1, 1, 1, 1, 1, 1) as the mute switch control data elements indicative of the operation states of the respective mute switches 7.

Furthermore, the eight mute switches 7 assume, for instance, the following states:

MUTE1 assumes the mute-on state;

MUTE2 assumes the mute-off state;

MUTE3 assumes the mute-on state;

MUTE4 assumes the mute-off state;

MUTE5 assumes the mute-off state;

MUTE6 assumes the mute-off state;

MUTE7 assumes the mute-off state; and

MUTE8 assumes the mute-off state, thereby causing the mute switch control data generating means 3 to generate the mute switch control data elements of (0, 1, 0, 1, 1, 1, 1, 1).

The mute switch control data elements may be expressed in binary form, decimal form, or hexadecimal form. The mute switch control data elements (0, 1, 0, 1, 1, 1, 1, 1), for instance, is expressed as 1011111 in binary form, 95 in decimal form, and 5F in hexadecimal form.

The mute switch control data determining means 4 is operated to determine that the mute executing switch 6 is to assume the mute-off state if the AND of bits indicative of the respective operation states of the mute switches 7 is "1" in binary form. On the other hand, the mute switch control data determining means 4 is operated to determine that the mute executing switch 6 is to assume the mute-on state if the AND of bits indicative of the respective operation states of the mute switches 7 is other than "1" in binary form.

This means that the mute switch control data determining means 4 is operated to determine that the mute executing switch 6 is to assume the mute-off state if the mute switch control data elements are (1, 1, 1, 1, 1, 1, 1, 1). The mute switch means 5 is then operated to have the mute executing switch 6 assume the mute-off state to unmute the audio signal inputted by the input terminal 1 so that the audio signal is outputted by the output terminal 2. On the other hand, the mute switch control data determining means 4 is operated to determine that the mute executing switch 6 is to assume the mute-on state if the mute switch control data elements are other than (1, 1, 1, 1, 1, 1, 1, 1).

This means if at least one of the mute switches 7 assumes the mute-on state, the mute switch means 5 is operated to have the mute executing switch 6 assume the mute-on state to mute the audio signal inputted by the input terminal 1 so that no audio signal is outputted by the output terminal 2. This leads to the fact that mute switch control data determining means 4 is operated to determine that the mute executing switch 6 is to assume the mute-on state on the basis of the mute switch control data elements (0, 1, 0, 1, 1, 1, 1, 1) and the mute switch means 5 is operated to have the mute executing switch 6 assume the mute-on state to mute the audio signal.

As will be appreciated from the foregoing description, the first preferred embodiment of the audio apparatus 100 according to the present invention comprises a plurality of mute switches 7 each operative to assume two operation states consisting of a mute-on state and a mute-off state; a mute executing switch 6 operative to assume two executing states consisting of a mute-on state and a mute-off state; mute switch control data generating means 3 for generating mute switch control data elements indicative of the operation states of the respective mute switches 7; mute switch control data determining means 4 for determining whether a mute executing switch 6 is to assume the mute-on or mute-off state on the basis of the mute switch control data elements; and mute switch means 5 for having the mute executing switch 6 selectively assume the mute-on and mute-off states on the basis of the mute-on or mute-off state determined by the mute switch control data determining means 4, thereby making it possible for the single mute switch means 5 to determine the execution state of the mute executing switch 6 to mute or unmute an audio signal inputted by the inputted terminal 1 on the basis of the operation states of a plurality of the mute switches. This means that the mute switch means 5 of the mute apparatus 100 thus constructed can control a plurality of mute switches 7 and replace a plurality of the mute switch means 24, 25, and 26 of the conventional mute apparatus 900 (see FIG. 9). This leads to the fact that the first embodiment of the mute apparatus 100 according to the present invention can reduce the number of mute switch means.

Figure 2:
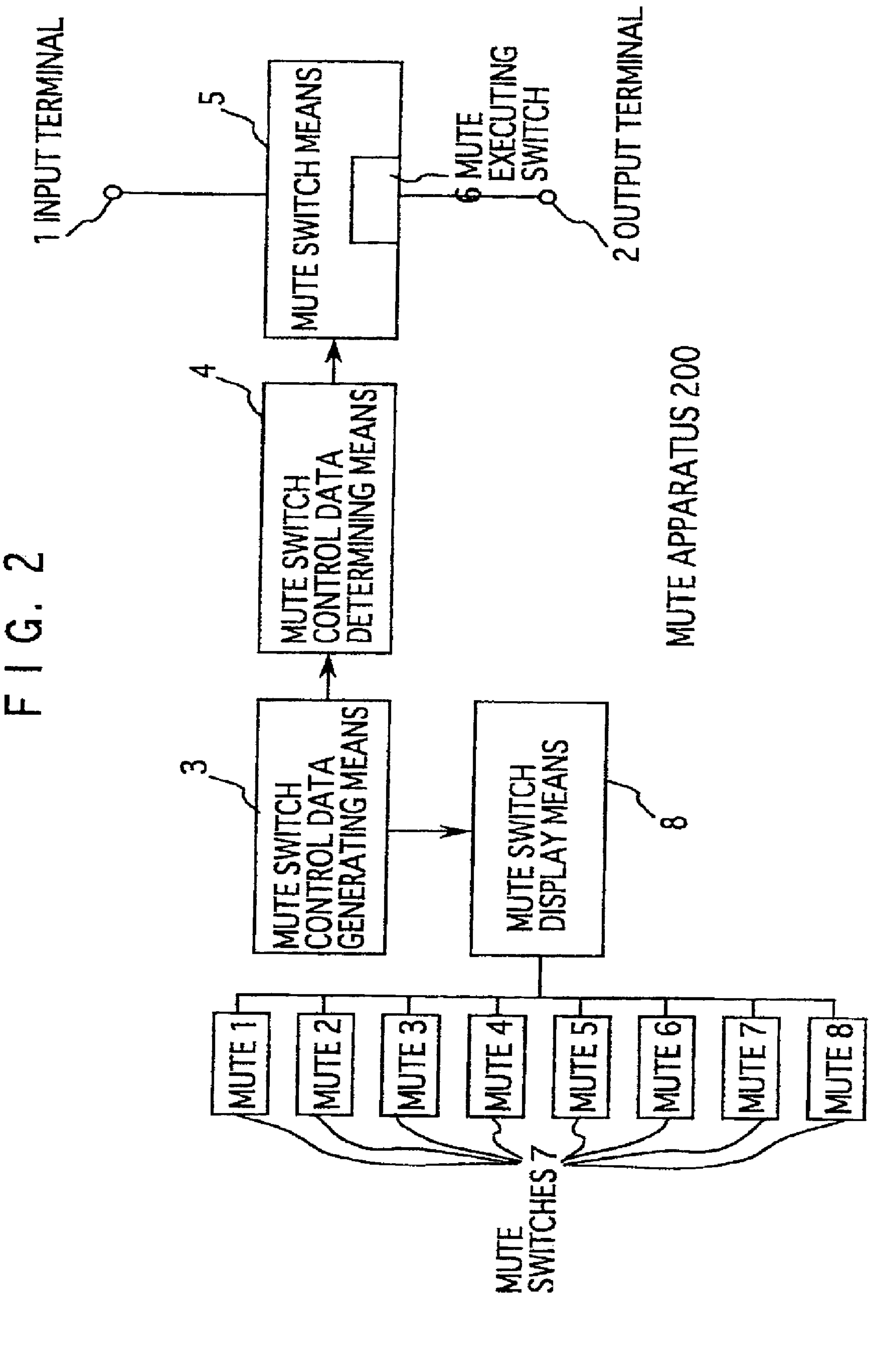
FIG. 2 is a block diagram of a second preferred embodiment of the mute apparatus according to the present invention.

Referring next to FIG. 2 of the drawings, there is shown a second preferred embodiment of the mute apparatus 200 according to the present invention. The mute apparatus 200 comprises an input terminal 1, an output terminal 2, mute switch control data generating means 3, mute switch control data determining means 4, mute switch means 5, a mute executing switch 6, a plurality of mute switches 7 each operative to assume two operation states consisting of a mute-on state and a mute-off state, and mute switch display means 8. The constitutional elements and parts of the second embodiment of the mute apparatus 200 same as those of the first embodiment of the mute apparatus 100 are simply represented by the same reference numerals as those of the mute apparatus 100 and will be partly omitted from description.

The mute switch display means 8 is adapted to selectively display mute-on and mute-off states of the respective mute switches 7 on the basis of the mute switch control data elements generated by the mute switch control data generating means 3. The mute switch display means 8 constitutes the switch state display means according to the present invention.

The operation of the second embodiment of the mute apparatus 200 will be described hereinlater with reference to FIG. 2.

According to the present invention, the mute apparatus 200 may have any number of mute switches 7. It is here assumed in the following description that the mute apparatus 200 has eight mute switches 7 placed in series for an audio signal.

The operations of the mute switch control data generating means 3, the mute switch control data determining means 4, the mute switch means 5, a mute executing switch 6, and mute switches 7 are the same as those of the mute apparatus 100.

The mute switch display means 8 is operated to selectively display the mute-on and mute-off states of the respective mute operation switches on the basis of the mute switch control data elements generated by the mute switch control data generating means 3. This means that the mute switch display means 8 may display the operation states of the respective mute switches 7 in the image as shown in FIG. 7. Furthermore, the mute switch display means 8 may display the operation states of the respective mute switches 7, for instance, on a personal computer display, thereby making it possible for an operator to visually observe the operation states of the respective mute switches 7.

As will be seen from the foregoing description, the mute apparatus 200 comprises the mute switch display means 8 operative to selectively display mute-on and mute-off states of the respective mute switches 7 on the basis of the mute switch control data elements generated by the mute switch control data generating means 3, thereby making it possible for an operator to visually observe the operation states of the respective mute switches 7 by means of the mute switch display means 8. This leads to the fact that the mute apparatus 200 thus constructed enables the operator to control a plurality of mute switches 7 by operating the mute switch means 5 and watching the mute switch display means 8. This leads to the fact that the second embodiment of the mute apparatus 200 can reduce the number of mute switch means.

Figure 3:
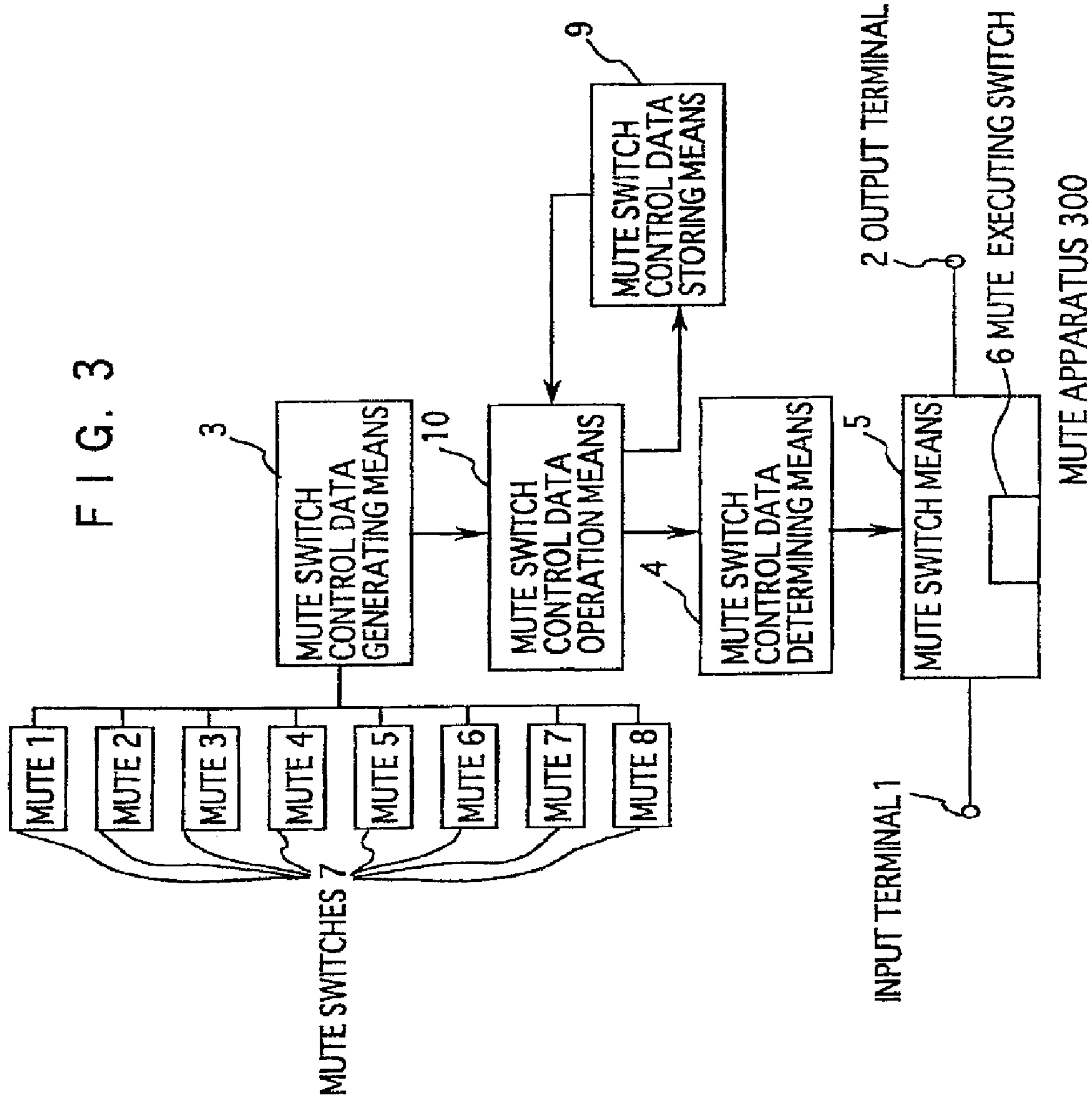
FIG. 3 is a block diagram of a third preferred embodiment of the mute apparatus according to the present invention.

Referring then to FIG. 3 of the drawings, there is shown a third preferred embodiment of the mute apparatus 300 according to the present invention. The mute apparatus 300 comprises an input terminal 1, an output terminal 2, mute switch control data generating means 3, mute switch control data determining means 4, mute switch means 5, a mute executing switch 6, a plurality of mute switches 7 each operative to assume two operation states consisting of a mute-on state and a mute-off state, mute switch control data storing means 9 and mute switch control data operation means 10. The constitutional elements and parts of the third embodiment of the mute apparatus 300 same as those of the second embodiment of the mute apparatus 200 are simply represented by the same reference numerals as those of the mute apparatus 200 and will be partly omitted from description.

The mute switch control data storing means 9 is adapted to store the mute switch control data elements. The mute switch control data operation means 10 is adapted to perform an operation between the mute switch control data elements generated by the mute switch control data generating means 3 and the mute switch control data elements currently stored in the mute switch control data storing means 9 to generate mute switch control data elements. The mute switch control data elements currently stored in the mute switch control data storing means 9 is intended to mean the mute switch control data elements previously generated or obtained and stored in mute switch control data storing means 9. The mute switch control data storing means 9 is adapted to store the mute switch control data elements obtained as a result of the operation performed by the mute switch control data operation means 10.

This means that the mute switch control data operation means 10 is adapted to perform an operation between the mute switch control data elements generated by the mute switch control data generating means 3 and the mute switch control data elements thus stored in the mute switch control data storing means 9 when the mute switch control data generating means 3 generates mute switch control data elements.

The operation of the third embodiment of the mute apparatus 300 will be described hereinlater with reference to FIG. 3.

According to the present invention, the mute apparatus 300 may have any number of mute switches 7. It is here assumed in the following description that the mute apparatus 300 has eight mute switches 7 placed in series for an audio signal.

The mute switches 7 are firstly operated to assume two operation states consisting of a mute-on state and a mute-off state. The eight mute switches 7 are placed in series and simply designated by MUTE1, MUTE2, . . . MUTE8, respectively as shown in FIG. 7. The mute-on state is intended to mean to mute an audio signal so that the audio signal is not outputted. The mute-off state is intended to mean to unmute an audio signal so that the audio signal is outputted. The mute switch control data generating means 3 is then operated to define the mute-on state as, for instance, "0" data element and the mute-off state as, for instance, "1" data element, thereby generating mute switch control data elements indicative of the operation states of the mute switches 7 consisting of a numerical array in the form of binary data of "0" and "1". This means that the mute switch control data elements indicative of the operation states of the eight respective mute switches 7 will be represented in the form of 8-bit data each consisting of binary data of "0" and "1" in order of the mute switches 7, i.e., MUTE1, MUTE2, . . . MUTE8.

All of the eight mute switches 7, for instance, assume the respective mute-on states, thereby causing the mute switch control data generating means 3 to generate 8-bit data of (0, 0, 0, 0, 0, 0, 0, 0) as the mute switch control data elements indicative of the operation states of the respective mute switches 7. All of the eight mute switches 7, for instance, assume the respective mute-off states, thereby causing the mute switch control data generating means 3 to generate 8-bit data of (1, 1, 1, 1, 1, 1, 1, 1) as the mute switch control data elements indicative of the operation states of the respective mute switches 7.

Furthermore, the eight mute switches 7 assume, for instance, the following states:

MUTE1 assumes the mute-on state;

MUTE2 assumes the mute-off state;

MUTE3 assumes the mute-on state;

MUTE4 assumes the mute-off state;

MUTE5 assumes the mute-off state;

MUTE6 assumes the mute-off state;

MUTE7 assumes the mute-off state; and

MUTE8 assumes the mute-off state, thereby causing the mute switch control data generating means 3 to generate the mute switch control data elements of (0, 1, 0, 1, 1, 1, 1, 1).

The mute switch control data elements may be expressed in binary form, decimal form, or hexadecimal form. The mute switch control data elements of (0, 1, 0, 1, 1, 1, 1, 1), for instance, is expressed as 1011111 in binary form, 95 in decimal form, and 5F in hexadecimal form.

The mute switch control data storing means 9 is operated to store the mute switch control data elements previously generated by the mute switch control data generating means 3. The mute switch control data elements of, for instance, (1, 1, 1, 1, 1, 1, 1, 1) are previously generated by the mute switch control data generating means 3 and stored by the mute switch control data storing means 9. The mute switch control data elements of (1, 1, 1, 1, 1, 1, 1, 1) represent that all of the mute switches 7 assume the mute-off states. The mute switch control data determining means 4 would determine the mute-off state of the mute executing switch 6 on the basis of the mute switch control data elements of (1, 1, 1, 1, 1, 1, 1) stored in the mute switch control data storing means 9.

The mute switch control data operation means 10 is then operated to perform an operation between the mute switch control data elements generated by the control data generating means 3, i.e., (0, 1, 0, 1, 1, 1, 1, 1) and the mute switch control data elements currently stored in the mute switch control data storing means 10, i.e., (1, 1, 1, 1, 1, 1, 1, 1) to generate new mute switch control data elements.

If the mute switch control data operation means 10 is operated to perform AND operation, the mute switch control data elements obtained as a result of the AND operation performed by the mute switch control data operation means 10 are (0, 1, 0, 1, 1, 1, 1, 1). The mute switch control data elements (0, 1, 0, 1, 1, 1, 1, 1) are expressed as 5F in hexadecimal form. The mute switch control data determining means 4 is then operated to determine that the mute executing switch 6 is to assume the mute-on state.

As described in the first embodiment of the mute apparatus 100, the mute switch control data determining means 4 is operated to determine that the mute executing switch 6 is to assume the mute-off state if the AND of bits indicative of the respective operation states of the mute switches 7 is "1" in binary form. On the other hand, the mute switch control data determining means 4 is operated to determine that the mute executing switch 6 is to assume the mute-on state if the AND of bits indicative of the respective operation states of the mute switches 7 is other than "1" in binary form.

The mute switch control data determining means 4 is accordingly operated to determine that the mute executing switch 6 is to assume the mute-on state on the basis of the mute switch control data elements (0, 1, 0, 1, 1, 1, 1).

On the basis of the mute-on or mute-off state determined by the mute switch control data determining means 4, the mute switch means 5 is operated to have the mute executing switch 6 assume the mute-on state to mute an audio signal inputted by the input terminal 1 so that the audio signal is not outputted by the output terminal 2.

As will be appreciated from the foregoing description, the third preferred embodiment of the audio apparatus 300 according to the present invention comprises a plurality of mute switches 7 each operative to assume two operation states consisting of a mute-on state and a mute-off state; a mute executing switch 6 operative to assume two executing states consisting of a mute-on state and a mute-off state; mute switch control data generating means 3 for generating mute switch control data elements indicative of the operation states of the respective mute switches 7; mute switch control data determining means 4 for determining whether a mute executing switch 6 is to assume the mute-on or mute-off state on the basis of the mute switch control data elements; mute switch means 5 for having the mute executing switch 6 selectively assume the mute-on and mute-off states on the basis of the mute-on or mute-off state determined by the mute switch control data determining means 4; mute switch control data storing means 9 for storing the mute switch control data elements; and mute switch control data operation means 10 for performing an operation between the mute switch control data elements generated by the mute switch control data generating means 3 and the mute switch control data elements currently stored in the mute switch control data storing means 9 to generate mute switch control data elements; whereby the mute switch control data storing means 9 is operated to store the mute switch control data elements obtained as a result of the operation performed by the mute switch control data operation means 10, and the control data determining means 4 is operated to determine whether the mute executing switch 6 is to assume the mute-on or mute-off state on the basis of the mute switch control data elements obtained as a result of the operation performed by the mute switch control data operation means 10, thereby making it possible for the single mute switch means 5 to determine the execution state of the mute executing switch 6 to mute or unmute an audio signal inputted by the inputted terminal 1 on the basis of the operation states of the mute switches 7. This means that the single mute switch means 5 of the mute apparatus 300 thus constructed can control a plurality of mute switches 7 and replace a plurality of the mute switch means 24, 25, and 26 of the conventional mute apparatus 900 (see FIG. 9). This leads to the fact that the third embodiment of the mute apparatus 300 according to the present invention can reduce the number of mute switch means.

Figure 4:
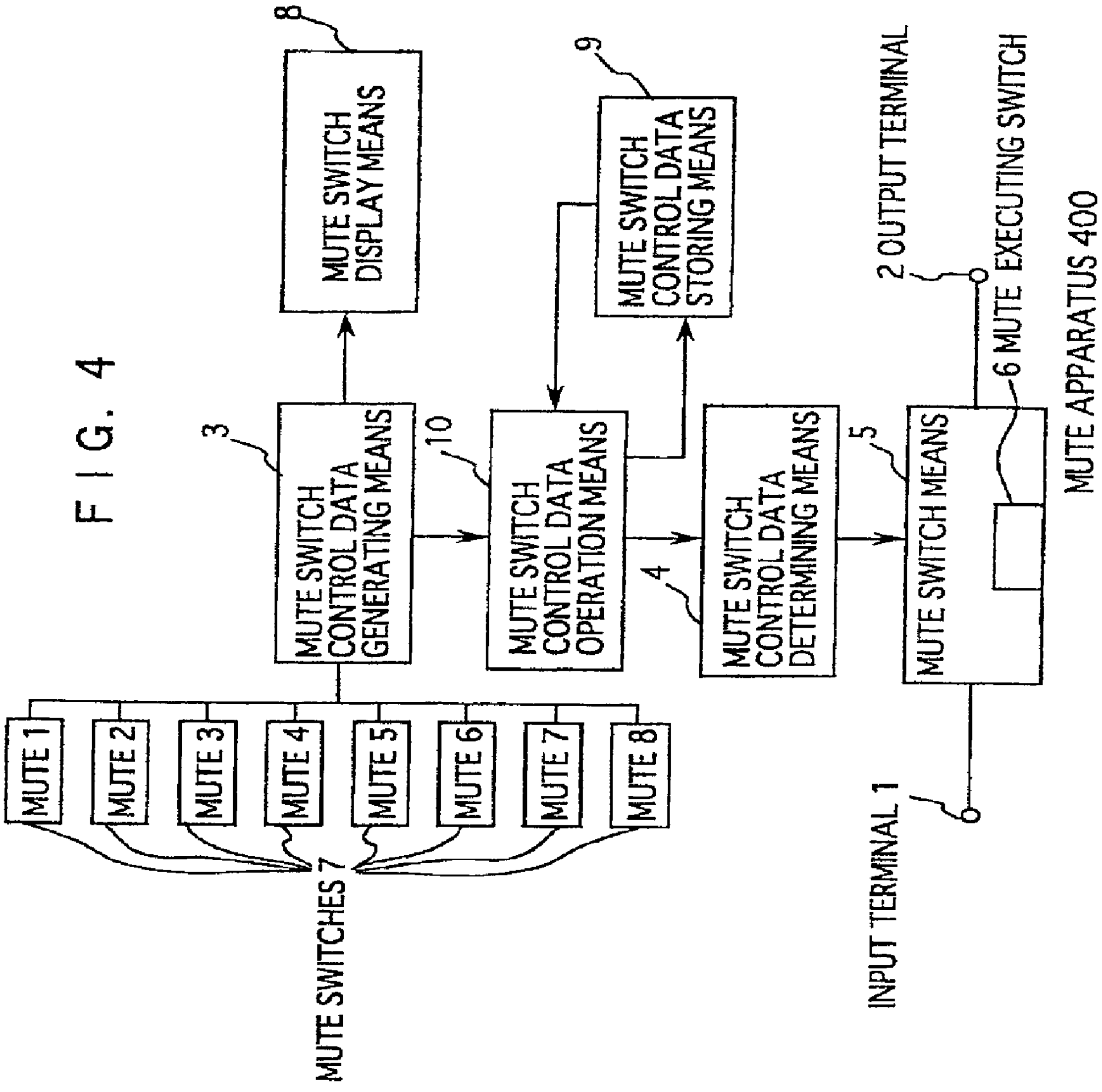
FIG. 4 is a block diagram of a fourth preferred embodiment of the mute apparatus according to the present invention.

Referring then to FIG. 4 of the drawings, there is shown a fourth embodiment of the mute apparatus 400 according to the present invention. The mute apparatus 400 comprises an input terminal 1, an output terminal 2, mute switch control data generating means 3, mute switch control data determining means 4, mute switch means 5, a mute executing switch 6, a plurality of mute switches 7 each operative to assume two operation states consisting of a mute-on state and a mute-off state, mute switch display means 8, mute switch control data storing means 9, and mute switch control data operation means 10. The constitutional elements and parts of the fourth embodiment of the mute apparatus 400 same as those of the third embodiment of the mute apparatus 300 are simply represented by the same reference numerals as those of the mute apparatus 100 and will be partly omitted from description.

The input terminal 1 is adapted to input an audio signal. The output terminal 2 is adapted to output an audio signal. The mute switch control data generating means 3 is adapted to generate mute switch control data elements indicative of the operation states of the respective mute switches 7. The mute switch 7 constitutes the mute operation switch according to the present invention. The mute switch means 5 includes the mute executing switch 6 operative to assume two executing states consisting of a mute-on state and a mute-off state. The mute switch means 5 constitutes the mute switch control means according to the present invention.

The mute switch control data determining means 4 is operated to determine whether the mute executing switch 6 is to assume the mute-on or mute-off state on the basis the mute switch control data elements obtained as a result of the operation performed by the mute switch control data operation means 10. The mute switch control data storing means 9 is adapted to store the mute switch control data elements.

The mute switch control data operation means 10 is adapted to perform an operation between the mute switch control data elements generated by the mute switch control data generating means 3 and the mute switch control data elements currently stored in the mute switch control data storing means 9 to generate mute switch control data elements. The mute switch control data elements currently stored in the mute switch control data storing means 9 is intended to mean the mute switch control data elements previously generated or obtained and stored in mute switch control data storing means 9. The mute switch control data storing means 9 is adapted to store the mute switch control data elements obtained as a result of the operation performed by the mute switch control data operation means 9.

This means that the mute switch control data operation means 10 will perform an operation between the mute switch control data elements generated by the mute switch control data generating means 3 and the mute switch control data elements thus stored in the mute switch control data storing means 9 when the mute switch control data generating means 3 generates mute switch control data elements.

The mute switch display means 8 is adapted to selectively display mute-on and mute-off states of the respective mute switches 7.

The operation of the fourth embodiment of the mute apparatus 400 will be described hereinlater with reference to FIG. 4.

According to the present invention, the mute apparatus 400 may have any number of mute switches 7. It is here assumed in the following description that the mute apparatus 400 has eight mute switches 7 placed in series for an audio signal.

The operations of the mute switch control data generating means 3, the mute switch control data determining means 4, the mute switch means 5, the mute executing switch 6, the mute switches 7, the mute switch control data storing means 9, and the mute switch control data operation means 10 are the same as those of the mute apparatus 300.

The mute switch display means 8 is operated to selectively display the mute-on and mute-off states of the respective mute operation switches 7 on the basis of the mute switch control data elements generated by the mute switch control data generating means 3. This means that the mute switch display means 8 may display the operation states of the respective mute switches 7 in the image as shown in FIG. 7. Furthermore, the mute switch display means 8 may display the operation states of the respective mute switches 7, for instance, on a personal computer display, thereby making it possible for an operator to visually observe the operation states of the respective mute switches 7.

As will be seen from the foregoing description, the mute apparatus 400 comprises the mute switch display means 8 operative to selectively display mute-on and mute-off states of the respective mute switches 7 on the basis of the mute switch control data elements generated by the mute switch control data generating means 3, thereby making it possible for an operator to visually observe the operation states of the respective mute switches 7 by means of the mute switch display means 8. This leads to the fact that the mute apparatus 400 thus constructed enables the operator to control a plurality of mute switches 7 by operating the single mute switch means 5 and watching the mute switch display means 8. This leads to the fact that the fourth embodiment of the mute apparatus 400 can reduce the number of mute switch means.

Figure 5:
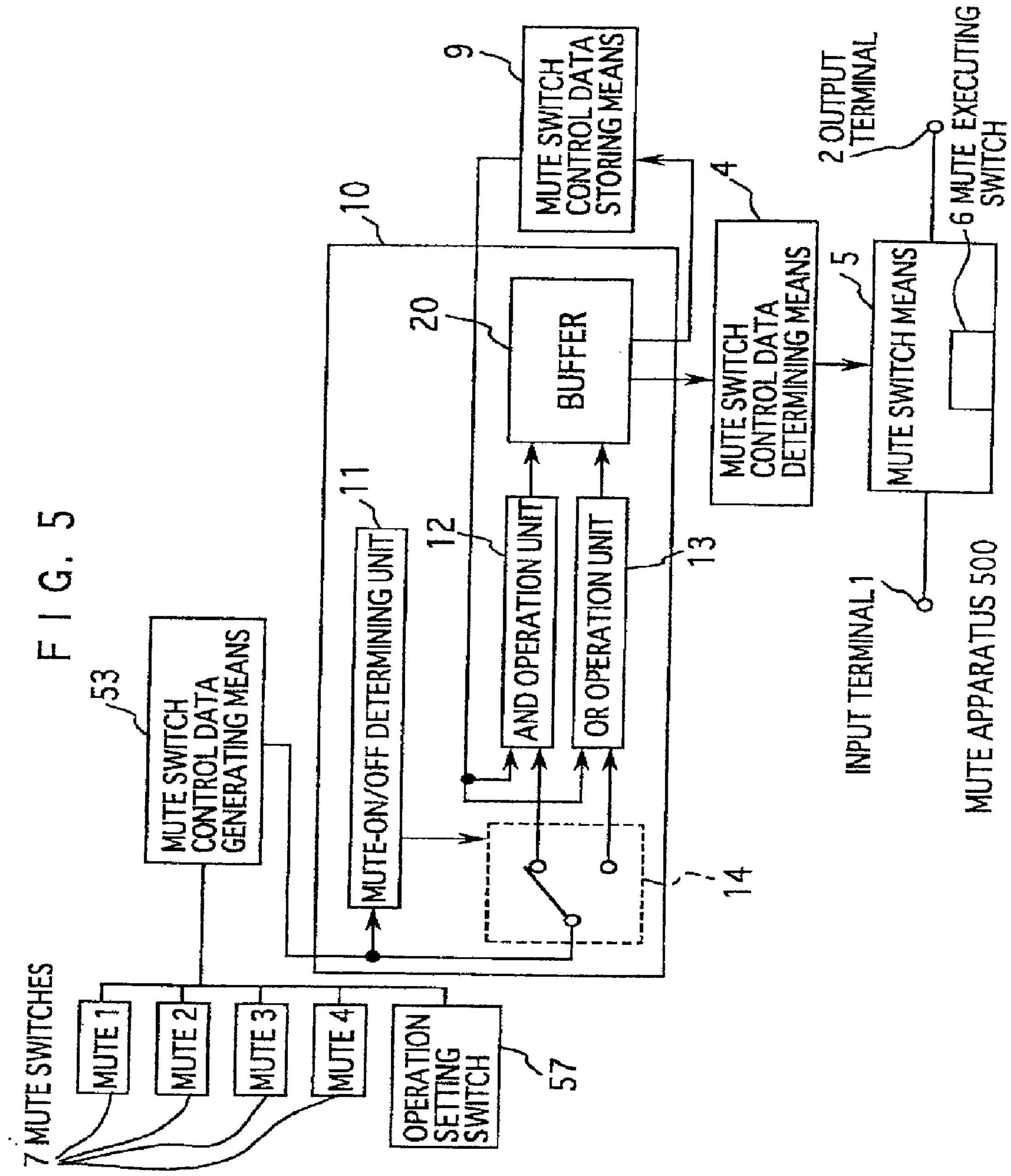
FIG. 5 is a block diagram of a fifth preferred embodiment of the mute apparatus according to the present invention.

Referring then to FIG. 5 of the drawings, there is shown a fifth embodiment of the mute apparatus 500 according to the present invention. The mute apparatus 500 comprises an input terminal 1, an output terminal 2, mute switch control data generating means 53, mute switch control data determining means 4, mute switch means 5, a mute executing switch 6, a plurality of mute switches 7 each operative to assume two operation states consisting of a mute-on state and a mute-off state, an operation setting switch 57 operative to assume two operation states consisting of a mute-on state and a mute-off state, mute switch display means 8, mute switch control data storing means 9, and mute switch control data operation means 10. The constitutional elements and parts of the fifth embodiment of the mute apparatus 500 same as those of the third embodiment of the mute apparatus 300 are simply represented by the same reference numerals as those of the mute apparatus 300 and will be partly omitted from description.

The mute switch control data operation means 10 comprises a mute-on/off determining unit 11, an AND operation unit 12, an OR operation unit 13, an operation switching unit 14, and a buffer 20.

Similar to the third embodiment of the mute apparatus 300, the input terminal 1 is adapted to input an audio signal. The output terminal 2 is adapted to output an audio signal. The mute switch control data generating means 53 is adapted to generate mute switch control data elements indicative of the operation states of the respective mute switches 7 and the operation setting switch 57. The mute switches 7 constitute the mute operation switches according to the present invention. The mute switch means 5 includes the mute executing switch 6 operative to assume two executing states consisting of a mute-on state and a mute-off state. The mute switch means 5 constitutes the mute switch control means according to the present invention.

The mute switch control data storing means 9 is adapted to store the mute switch control data elements. The mute switch control data operation means 10 is adapted to perform an operation between the mute switch control data elements generated by the mute switch control data generating means 53 and the mute switch control data elements currently stored in the mute switch control data storing means 9 to generate mute switch control data elements. The mute switch control data elements currently stored in the mute switch control data storing means 9 is intended to mean the mute switch control data elements previously generated or obtained and stored in mute switch control data storing means 9. The mute switch control data storing means 9 is adapted to store the mute switch control data elements obtained as a result of the operation performed by the mute switch control data operation means 10.

This means that the mute switch control data operation means 10 will perform an operation between the mute switch control data elements generated by the mute switch control data generating means 53 and the mute switch control data elements thus stored in the mute switch control data storing means 9 when the mute switch control data generating means 53 generates mute switch control data elements.

The AND operation unit 12 is adapted to perform an AND operation between the mute switch control data elements indicative of the respective operation states of the mute switches 7 generated by the mute switch control data generating means 53 and the mute switch control data elements indicative of the respective operation states of the mute switches 7 stored in the mute switch control data storing means 9 to generate mute switch control data elements. The OR operation unit 13 is adapted to perform an OR operation between the mute switch control data elements indicative of the respective operation states of the mute switches 7 generated by the mute switch control data generating means 53, and the mute switch control data elements indicative of the respective operation states of the mute switches 7 stored in the mute switch control data storing means 9 to generate mute switch control data elements.

The mute switch control data determining means 4 is adapted to determine whether the mute executing switch 6 is to assume the mute-on or mute-off state on the basis of the mute switch control data elements indicative of the operation states of the respective mute switches 7 obtained as a result of the operation performed by the mute switch control data operation means 10.

The mute-on/off determining unit 11 is adapted to select one operation from among the AND operation performed by the AND operation unit 12 and the OR operation performed by the OR operation unit 13 on the basis of the operation state of the operation setting switch 57 contained in the mute switch control data elements generated by the mute switch control data generating means 53. The operation switching unit 14 is adapted to selectively switch to the AND operation unit 12 and the OR operation unit 13 on the basis of the operation selected by the mute-on/off determining unit 11.

The buffer 20 is adapted to temporally store the mute switch control data elements generated by the AND operation unit 12 or the OR operation unit 13. The mute switch control data elements stored in the buffer 20 will then be transferred to the mute switch control data determining means 4 and stored in the mute switch control data storing means 9.

The operation of the fifth embodiment of the mute apparatus 500 will be described hereinlater with reference to FIG. 5.

According to the present invention, the mute apparatus 500 may have any number of mute switches 7. It is here assumed in the following description that the mute apparatus 500 has four mute switches 7 placed in series for an audio signal.

Figure 8:
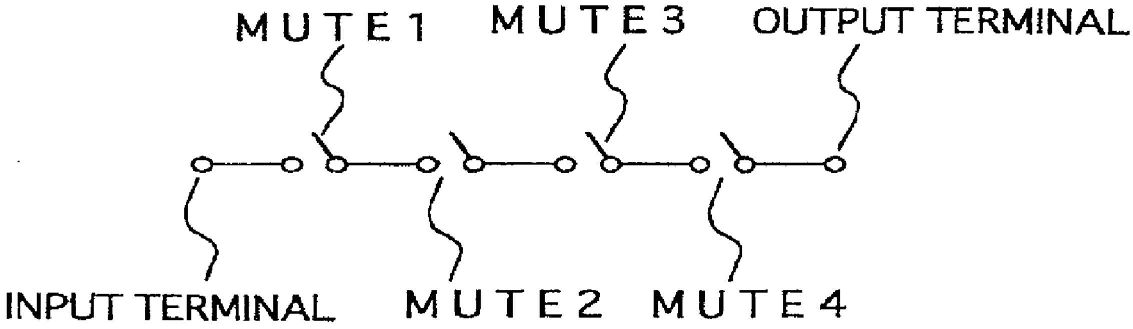
FIG. 8 is a block diagram of mute switches, input and output terminals forming part of the mute apparatus shown in FIG. 5 or 6.

The mute switch 7 is operated to assume two operation states consisting of a mute-on state and a mute-off state. The four mute switches 7 are designated by MUTE1, MUTE2, . . . MUTE4, respectively as shown in FIG. 8. The mute-on state is intended to mean to mute an audio signal so that the audio signal is not outputted. The mute-off state is intended to mean to unmute an audio signal so that the audio signal is outputted. The mute switch control data generating means 53 is operative to define the mute-on state as, for instance, "0" data element and the mute-off state as, for instance, "1" data element, thereby generating mute switch control data elements consisting of a numerical array in the form of binary data of "0" and "1". This means that the mute switch control data elements indicative of the operation states of the four respective mute switches 7 and the operation setting switch 57 will be represented in the form of 5-bit data each consisting of binary data of "0" and "1" in order of the mute switches 7, i.e., MUTE1, MUTE2, . . . MUTE4, and the operation setting switch 57.

All of the four mute switches 7 and the operation setting switch 57, for instance, assume the respective mute-on states, thereby causing the mute switch control data generating means 53 to generate 4-bit data of (0, 0, 0, 0, 0) as the mute switch control data elements indicative of the respective operation states of the mute switches 7 and the operation setting switch 57. All of the four mute switches 7 and the operation setting switch 57, for instance, assume the respective mute-off states, thereby causing the mute switch control data generating means 53 to generate 4-bit data of (1, 1, 1, 1, 1) as the mute switch control data elements indicative of the respective operation states of the mute switches 7 and the operation setting switch 57.

Furthermore, the four mute switches 7 and the operation setting switch 57 assume, for instance, the following states:

MUTE1 assumes the mute-on state;

MUTE2 assumes the mute-off state;

MUTE3 assumes the mute-on state;

MUTE4 assumes the mute-off state; and the operation setting switch assumes the mute-on state;

thereby causing the mute switch control data generating means 53 to generate the mute switch control data elements of (0, 1, 0, 1, 0).

The mute switch control data elements may be expressed in binary form, decimal form, or hexadecimal form.

Hereinlater, the mute-on and mute-off states of the operation setting switch 57 will be designated by "mute-on" and "mute-off", respectively for convenience.

Examples of the operation states of the four respective mute switches 7 and the operation setting switch 57 and mute switch control data elements generated by the mute switch control data generating means 53 are stated below:

EXAMPLE 1

MUTE1, MUTE2, MUTE3, MUTE4, and the operation setting switch 57 assume the mute-on, mute-off, mute-off, mute-off, mute-on respectively, so the mute switch control data generating means 53 generates mute switch control data elements (0, 1, 1, 1, mute-on).

EXAMPLE 2

MUTE1, MUTE2, MUTE3, MUTE4, and the operation setting switch 57 assume the mute-on, mute-on, mute-off, mute-off, mute-on respectively, so the mute switch control data generating means 53 generates mute switch control data elements (0, 0, 1, 1, mute-on).

EXAMPLE 3

MUTE1, MUTE2, MUTE3, MUTE4, and the operation setting switch 57 assume the mute-off, mute-off, mute-on, mute-on, mute-on respectively, so the mute switch control data generating means 53 generates mute switch control data elements (1, 1, 0, 0, mute-on).

EXAMPLE 4

MUTE1, MUTE2, MUTE3, MUTE4, and the operation setting switch 57 assume the mute-off, mute-off, mute-off, mute-on, mute-on respectively, so the mute switch control data generating means 53 generates mute switch control data elements (1, 1, 1, 0, mute-on).

EXAMPLE 5

MUTE1, MUTE2, MUTE3, MUTE4, and the operation setting switch 57 assume the mute-off, mute-on, mute-on, mute-on, mute-off respectively, so the mute switch control data generating means 53 generates mute switch control data elements (1, 0, 0, 0, mute-off).

EXAMPLE 6

MUTE1, MUTE2, MUTE3, MUTE4, and the operation setting switch 57 assume the mute-off, mute-off, mute-on, mute-on, mute-off respectively, so the mute switch control data generating means 53 generates mute switch control data elements (1, 1, 0, 0, mute-off).

EXAMPLE 7

MUTE1, MUTE2, MUTE3, MUTE4, and the operation setting switch 57 assume the mute-on, mute-on, mute-off, mute-off, mute-off respectively, so the mute switch control data generating means 53 generates mute switch control data elements (0, 0, 1, 1, mute-off).

EXAMPLE 8

MUTE1, MUTE2, MUTE3, MUTE4, and the operation setting switch 57 assume the mute-off, mute-off, mute-off, mute-off, mute-off respectively, so the mute switch control data generating means 53 generates mute switch control data elements (1, 1, 1, 1, mute-off).

The mute-on/off determining unit 11 is adapted to select one operation from among the AND operation performed by the AND operation unit 12 and the OR operation performed by the OR operation unit 13 on the basis of the operation state of the operation setting switch 57 contained in the mute switch control data elements generated by the mute switch control data generating means 53.

(1) The case that the mute switch control data elements indicate that the operation state of the operation setting switch 57 is mute-on.

The mute-on/off determining unit 11 is operated to select the AND operation performed by the AND operation unit 12, and the operation switching unit 14 is operated to switch to the AND operation unit 12, and to input the mute switch control data elements generated by the mute switch control data generating means 53 and mute switch control data elements currently stored in the mute switch control data storing means 9 to the AND operation unit 12. The AND operation unit 12 is then operated to perform the AND operation between the mute switch control data elements indicative of the respective operation states of the mute switches 7 generated by the mute switch control data generating means 53 and the mute switch control data elements indicative of the respective operation states of the mute switches 7 currently stored in the mute switch control data storing means 9 to generate mute switch control data elements. The mute switch control data elements thus obtained as a result of the operation performed by the AND operation unit 12 is stored in the buffer 20.

Here, the mute switch control data elements currently stored in the mute switch control data storing means 9 is intended to mean the mute switch control data elements previously generated or obtained and stored in mute switch control data storing means 9.

The AND operation performed between the mute switch control data elements indicative of the respective operation states of the mute switches 7 generated by the mute switch control data generating means 53 and the mute switch control data elements indicative of the respective operation states of the mute switches 7 currently stored in the mute switch control data storing means 9 will be described in details.

MUTE1, MUTE2, MUTE3, and MUTE4 assume, for instance, the mute-on, mute-off, mute-on, and mute-off states, respectively, so the mute switch control data generating means 53 generates mute switch control data elements (0, 1, 0, 1, mute-on) and the mute switch control data storing means 9 stores the mute switch control data elements (0, 1, 0, 1, mute-on).

MUTE2 and MUTE 4, for instance, are then operated to assume the respective mute-on states and MUTE1 and MUTE3 are not operated, that is, MUTE1 and MUTE3 assume the respective mute-off states, so the mute switch control data generating means 53 generates the mute switch control data elements (1, 0, 1, 0, mute-on).

The AND operation unit 12 is then operated to perform the AND operation between the mute switch control data elements indicative of the respective operation states of the mute switches 7 (1, 0, 1, 0) generated by the mute switch control data generating means 53, and the mute switch control data elements indicative of the respective operation states of the mute switches 7 (0, 1, 0, 1) currently stored in the mute switch control data storing means 9 to generate mute switch control data elements (0, 0, 0, 0, mute-on). The mute switch control data elements (0, 0, 0, 0, mute-on) thus obtained as a result of the operation performed by the AND operation unit 12 is stored in the buffer 20. The mute switch control data elements (0, 0, 0, 0, mute-on) indicate that the MUTE1, MUTE2, MUTE3 and MUTE4 assume the respective mute-on states.

The mute switch control data determining means 4 is then operated to determine that the mute executing switch 6 is to assume the mute-on or mute-off state on the basis of the mute switch control data elements (0, 0, 0, 0) indicative of the respective operation states of the mute switches 7 stored in the buffer 20.

The mute switch control data determining means 4 is operated to determine that the mute executing switch 6 is to assume the mute-off state if the AND of bits indicative of the respective operation states of the mute switches 7 is "1" in binary form or "F" in hexadecimal form. On the other hand, the mute switch control data determining means 4 is operated to determine that the mute executing switch 6 is to assume the mute-on state if the AND of bits indicative of the respective operation states of the mute switches 7 is other than "1" in binary form or "F" in hexadecimal form.

Bits of the mute switch control data elements indicative of the mute switches 4 are (0, 0, 0, 0). Thus the AND of the bits is "0". The mute switch control data determining means 4 is accordingly operated to determine that the mute executing switch 6 is to assume the mute-on state. The mute switch control data elements (0, 0, 0, 0, mute-on) is then stored in the mute switch control data storing means 9.

(2) The case that the mute switch control data elements indicate that the operation state of the operation setting switch 57 is mute-off.

The mute-on/off determining unit 11 is operated to select the OR operation performed by the OR operation unit 13, and the operation switching unit 14 is operated to switch to the OR operation unit 13, and to input the mute switch control data elements generated by the mute switch control data generating means 53 and the mute switch control data elements currently stored in the mute switch control data storing means 9 to the OR operation unit 13. The OR operation unit 13 is then operated to perform the OR operation between the mute switch control data elements indicative of the respective operation states of the mute switches 7 generated by the mute switch control data generating means 53 and the mute switch control data elements indicative of the respective operation states of the mute switches 7 currently stored in the mute switch control data storing means 9 to generate mute switch control data elements. The mute switch control data elements thus obtained as a result of the operation performed by the OR operation unit 13 is stored in the buffer 20.

Here, the mute switch control data elements currently stored in the mute switch control data storing means 9 is intended to mean the mute switch control data elements previously generated or obtained and stored in mute switch control data storing means 9.

The OR operation performed between the mute switch control data elements indicative of the respective operation states of the mute switches 7 generated by the mute switch control data generating means 53 and the mute switch control data elements indicative of the respective operation states of the mute switches 7 currently stored in the mute switch control data storing means 9 will be described in details.

MUTE1, MUTE2, MUTE3, and MUTE4 assume, for instance, the mute-off, mute-on, mute-off, and mute-on states, respectively, so the mute switch control data generating means 53 generates mute switch control data elements (1, 0, 1, 0, mute-off) and the mute switch control data storing means 9 stores the mute switch control data elements (1, 0, 1, 0, mute-off).

MUTE1 and MUTE 3, for instance, are then operated to assume the respective mute-on states, and MUTE2 and MUTE4 are not operated, that is, MUTE2 and MUTE4 assume the respective mute-off states, so the mute switch control data generating means 53 generates the mute switch control data elements (0, 1, 0, 1, mute-off).

The OR operation unit 13 is then operated to perform the OR operation between the mute switch control data elements indicative of the respective operation states of the mute switches 7 (0, 1, 0, 1) generated by the mute switch control data generating means 53, and the mute switch control data elements indicative of the respective operation states of the mute switches 7 (1, 0, 1, 0) currently stored in the mute switch control data storing means 9 to generate mute switch control data elements (1, 1, 1, 1, mute-off). The mute switch control data elements (1, 1, 1, 1, mute-off) obtained as a result of the operation performed by the OR operation unit 13 is stored in the buffer 20. The mute switch control data elements (1, 1, 1, 1, mute-off) indicate that the MUTE1, MUTE2, MUTE3 and MUTE4 assume the respective mute-off states.

The mute switch control data determining means 4 is operated to determine whether the mute executing switch 6 is to assume the mute-on or mute-off state on the basis of the mute switch control data elements indicative of the respective operation states of the mute switches 7 (1, 1, 1, 1) stored in the buffer 20.

The mute switch control data determining means 4 is operated to determine that the mute executing switch 6 is to assume the mute-off state if the AND of bits indicative of the respective operation states of the mute switches 7 is "1" in binary form or "F" in hexadecimal form. On the other hand, the mute switch control data determining means 4 is operated to determine that the mute executing switch 6 is to assume the mute-on state if the AND of bits indicative of the respective operation states of the mute switches 7 is other than "1" in binary form or "F" in hexadecimal form.

Bits of the mute switch control data elements indicative of the mute switches 4 are (1, 1, 1, 1, mute-off). Thus the AND of the bits is "1". The mute switch control data determining means 4 is accordingly operated to determine that the mute executing switch 6 is to assume the mute-off state. The mute switch control data elements (1, 1, 1, 1, mute-off) is then stored in the mute switch control data storing means 9.

As will be appreciated from the foregoing description, the fifth preferred embodiment of the audio apparatus 500 according to the present invention comprises a plurality of mute switches 7 each operative to assume two operation states consisting of a mute-on state and a mute-off state; an operation setting switch operative to assume two operation states consisting of a mute-on and a mute-off state, a mute executing switch 6 operative to assume two executing states consisting of a mute-on state and a mute-off state; mute switch control data generating means 53 for generating mute switch control data elements indicative of the operation states of the respective mute switches 7; mute switch control data determining means 4 for determining whether a mute executing switch 6 is to assume the mute-on or mute-off state on the basis of the mute switch control data elements obtained as a result of the operation performed by a mute switch control data operation means 10; and mute switch means 5 for having the mute executing switch 6 selectively assume the mute-on and mute-off states on the basis of the mute-on or mute-off state determined by the mute switch control data determining means 4, a mute-on/off determining unit 11, an AND operation unit 12, an OR operation unit 13, an operation switching unit 14, a buffer 20, thereby making it possible for the single mute switch means 5 to determine the execution state of the mute executing switch 6 to mute or unmute an audio signal inputted by the inputted terminal 1 on the basis of the operation states of a plurality of the mute switches.

Figure 9:
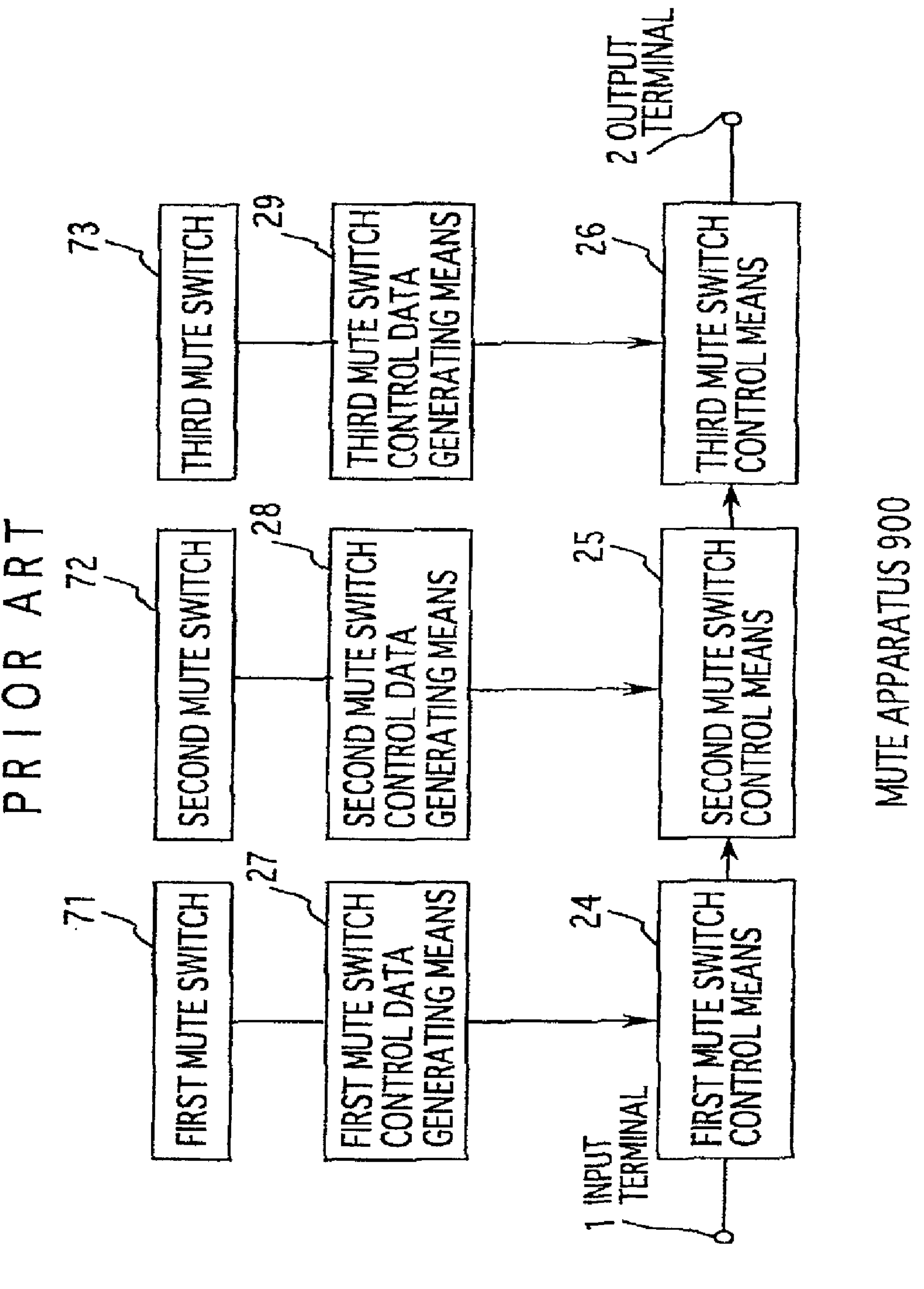
FIG. 9 is a block diagram of a conventional mute apparatus.

This means that the single mute switch means 5 of the mute apparatus 500 thus constructed can control a plurality of mute switches 7 and replace a plurality of the mute switch means 24, 25, and 26 of the conventional mute apparatus 900 (see FIG. 9). This leads to the fact that the fifth embodiment of the mute apparatus 500 according to the present invention can reduce the number of mute switch means.

Figure 6:
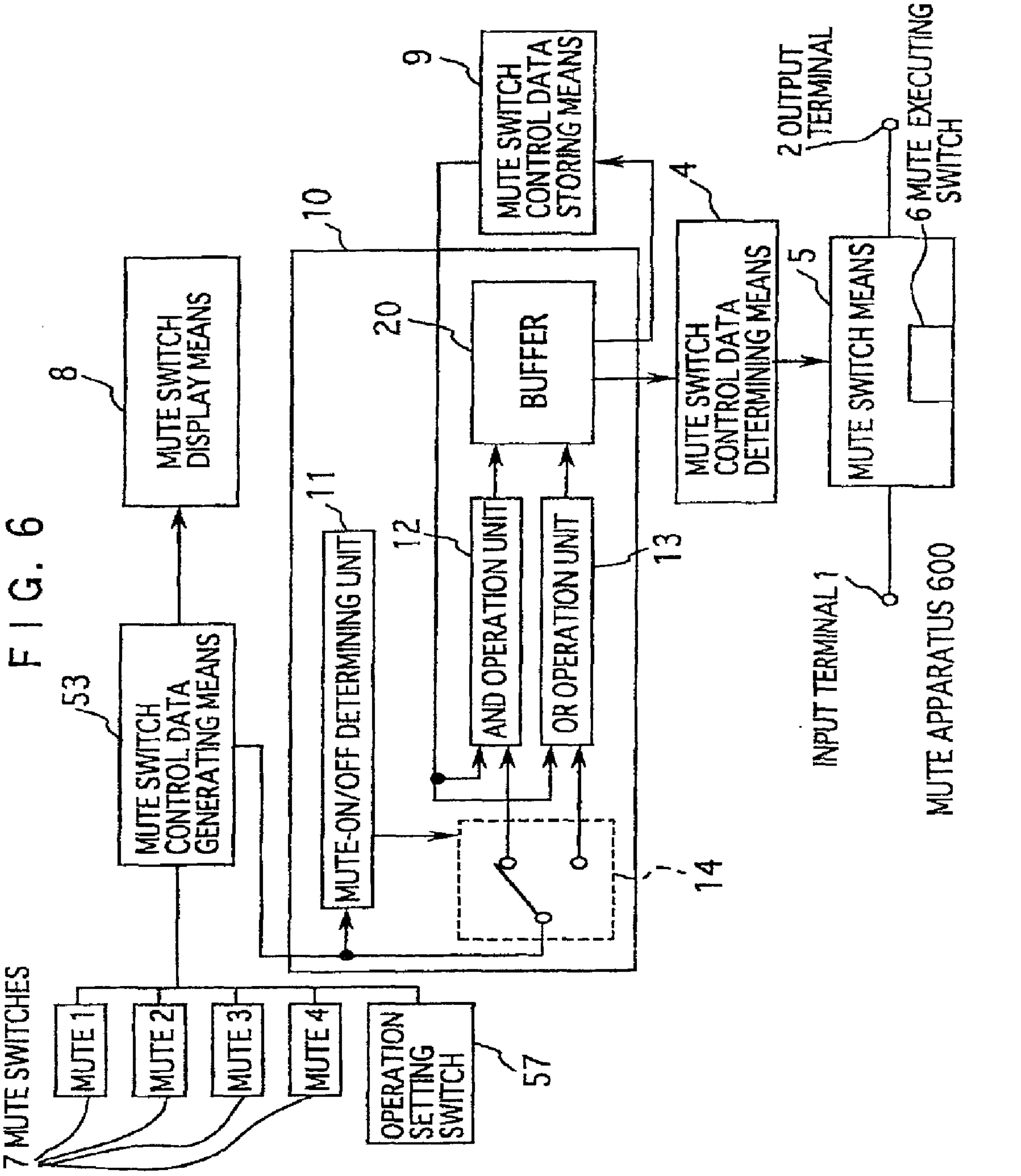
FIG. 6 is a block diagram of a sixth preferred embodiment of the mute apparatus according to the present invention.

Referring next to FIG. 6 of the drawings, there is shown a sixth preferred embodiment of the mute apparatus 600 according to the present invention. The mute apparatus 600 comprises an input terminal 1, an output terminal 2, mute switch control data generating means 53, mute switch control data determining means 4, mute switch means 5, a mute executing switch 6, a plurality of mute switches 7 each operative to assume two operation states consisting of a mute-on state and a mute-off state, an operation setting switch 57 operative to assume two operation states consisting of a mute-on state and a mute-off state, mute switch display means 8, mute switch control data storing means 9, and mute switch control data operation means 10. The constitutional elements and parts of the sixth embodiment of the mute apparatus 600 same as those of the third embodiment of the mute apparatus 500 are simply represented by the same reference numerals as those of the mute apparatus 500 and will be partly omitted from description.

Similar to the fifth embodiment of the mute apparatus 500, the input terminal 1 is adapted to input an audio signal. The output terminal 2 is adapted to output an audio signal. The mute switch control data generating means 53 is adapted to generate mute switch control data elements indicative of the respective operation states of the mute switches 7 and the operation setting switch 57. The mute switches 7 and the operation setting switch 57 constitute the mute operation switches according to the present invention. The mute switch means 5 includes the mute executing switch 6 operative to assume two executing states consisting of a mute-on state and a mute-off state. The mute switch means 5 constitutes the mute switch control means according to the present invention.

The mute switch control data operation means 10 is adapted to perform an operation between the mute switch control data elements generated by the mute switch control data generating means 53 and the mute switch control data elements currently stored in the mute switch control data storing means 9 to generate mute switch control data elements. The mute switch control data elements currently stored in the mute switch control data storing means 9 is intended to mean the mute switch control data elements previously generated or obtained and stored in mute switch control data storing means 9. The mute switch control data storing means 9 is adapted to store the mute switch control data elements obtained as a result of the operation performed by the mute switch control data operation means 10.

The mute switch display means 8 is adapted to selectively display mute-on and mute-off states of the respective mute switches 7 on the basis of the mute switch control data elements generated by the mute switch control data generating means 53. The mute switch display means 8 constitutes the switch state display means according to the present invention.

The operation of the sixth embodiment of the mute apparatus 600 will be described hereinlater.

According to the present invention, the mute apparatus 600 may have any number of mute switches 7. It is here assumed in the following description that the mute apparatus 600 has four mute switches 7 placed in series for an audio signal.

The mute switch 7 is operated to assume two operation states consisting of a mute-on state and a mute-off state. The four mute switches 7 are placed in series and simply designated by MUTE1, MUTE2, . . . MUTE4, respectively as shown in FIG. 8. The mute-on state is intended to mean to mute an audio signal so that the audio signal is not outputted. The mute-off state is intended to mean to unmute an audio signal so that the audio signal is outputted. The mute switch control data generating means 53 is operative to define the mute-on state as, for instance, "0" data element and the mute-off state as, for instance, "1" data element, thereby generating mute switch control data elements consisting of a numerical array in the form of binary data of "0" and "1". This means that the mute switch control data elements indicative of the operation states of the four respective mute switches 7 will be represented in the form of 4-bit data each consisting of binary data of "0" and "1" in order of the mute switches 7, i.e., MUTE1, MUTE2, . . . MUTE4.

The operations of the mute switch control data generating means 53, the mute switch control data determining means 4, the mute switch means 5, a mute executing switch 6, and mute switches 7 are the same as those of the mute apparatus 100.

The mute switch display means 8 is operated to selectively display the mute-on and mute-off states of the respective mute operation switches on the basis of the mute switch control data elements generated by the mute switch control data generating means 53. This means that the mute switch display means 8 may display the operation states of the respective mute switches 7 in the image as shown in FIG. 8. Furthermore, the mute switch display means 8 may display the operation states of the respective mute switches 7, for instance, on a personal computer display, thereby making it possible for an operator to visually observe the operation states of the respective mute switches 7.

As will be seen from the foregoing description, the mute apparatus 600 comprises the mute switch display means 8 operative to selectively display mute-on and mute-off states of the respective mute switches 7 on the basis of the mute switch control data elements generated by the mute switch control data generating means 53, thereby making it possible for an operator to visually observe the operation states of the respective mute switches 7 by means of the mute switch display means 8. This leads to the fact that the mute apparatus 600 thus constructed enables the operator to control a plurality of mute switches 7 by operating the single mute switch means 5 and watching the mute switch display means 8. This leads to the fact that the sixth embodiment of the mute apparatus 600 can reduce the number of mute switch means.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A mute apparatus comprising:

a plurality of mute operation switches each operative to assume two operation states consisting of a mute-on state and a mute-off state;

a mute executing switch operative to assume two executing states consisting of a mute-on state and a mute-off state;

mute switch control data generating means for generating mute switch control data elements indicative of said operation states of said mute operation switches;

control data determining means for determining whether said mute executing switch is to assume said mute-on or mute-off state on the basis of said mute switch control data elements;

mute switch control means for having said mute executing switch selectively assume said mute-on and mute-off states on the basis of said mute-on or mute-off state determined by said control data determining means, mute switch control data storing means for storing said mute switch control data elements; and mute switch control data operation means for performing an operation between said mute switch control data elements generated by said mute switch control data generating means and said mute switch control data elements currently stored in said mute switch control data storing means to generate mute switch control data elements; and in which said mute switch control data storing means is operated to store said mute switch control data elements obtained as a result of said operation performed by said mute switch control data operation means, and said control data determining means is operated to determine whether said mute executing switch is to assume said mute-on or mute-off state on the basis of said mute switch control data elements obtained as a result of said operation performed by said mute switch control data operation means.

2. A mute apparatus as set forth in claim 1, further comprising switch state display means for selectively displaying said mute-on and mute-off states of said mute operation switches on the basis of said mute switch control data elements generated by said mute switch control data generating means.

3. A mute apparatus as set forth in claim 1, further comprising switch state display means for selectively displaying said mute-on and mute-off states of said mute operation switches on the basis of said mute switch control data elements generated by said mute switch control data generating means.

4. A mute apparatus as set forth in claim 1, further comprising an operation setting switch operative to assume two operation states consisting of a mute-on state and a mute-off state, in which said mute switch control data generating means is operated to generate mute switch control data elements indicative of said operation states of said mute operation switches and said operation setting switch, and said mute switch control data operation means is constituted by:

an AND operation unit for performing an AND operation between said mute switch control data elements indicative of said operation states of said mute operation switches generated by said mute switch control data generating means and said mute switch control data elements indicative of said operation states of said mute operation switches stored in said mute switch control data storing means;

an OR operation unit for performing an OR operation between said mute switch control data elements indicative of said operation states of said mute operation switches generated by said mute switch control data generating means, and said mute switch control data elements indicative of said operation states of said mute operation switches stored in said mute switch control data storing means;

a selecting unit for selecting said operation from among said AND operation performed by said AND operation unit and said OR operation performed by said OR operation unit on the basis of said mute switch control data elements generated by said mute switch control data generating means; and an operation switching unit for selectively switching to said AND operation unit and said OR operation unit on the basis of said operation selected by said selecting unit.

5. A mute apparatus as set forth in claim 4, further comprising switch state display means for selectively displaying said mute-on and mute-off states of said mute operation switches on the basis of said mute switch control data elements generated by said mute switch control data generating means.

6. A mute method comprising the steps of:

(a) having mute operation switches selectively assume two operation states consisting of a mute-on state and a mute-off state;

(b) generating mute switch control data elements indicative of said operation states of said mute operation switches;

(c) determining whether a mute executing switch is to assume said mute-on or mute-off state on the basis of said mute switch control data elements generated in the step (b);

(d) having said mute executing switch selectively assume the mute-on and mute-off states on the basis of said mute-on or mute-off state determined in the step (c);

(f) storing said mute switch control data elements; and (g) performing an operation between said mute switch control data elements generated in the step (b) and said mute switch control data elements currently stored in the step (f) to generate mute switch control data elements, and in which the step (f) has the step of storing said mute switch control data elements obtained as a result of said operation performed in the step (g), and the step (c) has the step of determining whether said mute executing switch is to assume said mute-on or mute-off state on the basis of said mute switch control data elements obtained as a result of said operation performed in the step (g).

7. A mute method as set forth in claim 6, further comprising the step of:

(h) selectively displaying said mute-on and mute-off states of said mute operation switches on the basis of said mute switch control data elements generated in the step (b).

8. A mute method as set forth in claim 6, further comprising the step of:

(e) selectively displaying said mute-on and mute-off states of said mute operation switches on the basis of said mute switch control data elements generated in the step (b).

9. A mute method as set forth in claim 6, in which said step (a) has the step of having an operation setting switch selectively assume two operation states consisting of a mute-on state and a mute-off state, said step (b) has the step of generating mute switch control data elements indicative of said operation states of said mute operation switches and said operation setting switch, and said step (g) includes the steps of:

(g1) performing an AND operation between said mute switch control data elements indicative of said operation states of said mute operation switches generated in the step (b) and said mute switch control data elements indicative of said operation states of said mute operation switches stored in the step (f);

(g2) performing an OR operation between said mute switch control data elements indicative of said operation states of said mute operation switches generated in the step (b), and said mute switch control data elements indicative of said operation states of said mute operation switches stored in the step (f);

(g3) selecting said operation step from among the step (g1) and the step (g2) on the basis of said mute switch control data elements generated in the step (b); and (g4) selectively switching to said step (g1) and said step (g2) on the basis of said operation selected in said step (g3).

10. A mute method as set forth in claim 9, further comprising the step of:

(i) selectively displaying said mute-on and mute-off states of said mute operation switches on the basis of said mute switch control data elements generated in the step (b).

* * * * *